T. WALLACE.
PHOTOGRAPHIC CAMERA.
APPLICATION FILED OCT. 9, 1920.
1,430,478.
Patented Sept. 26, 1922.
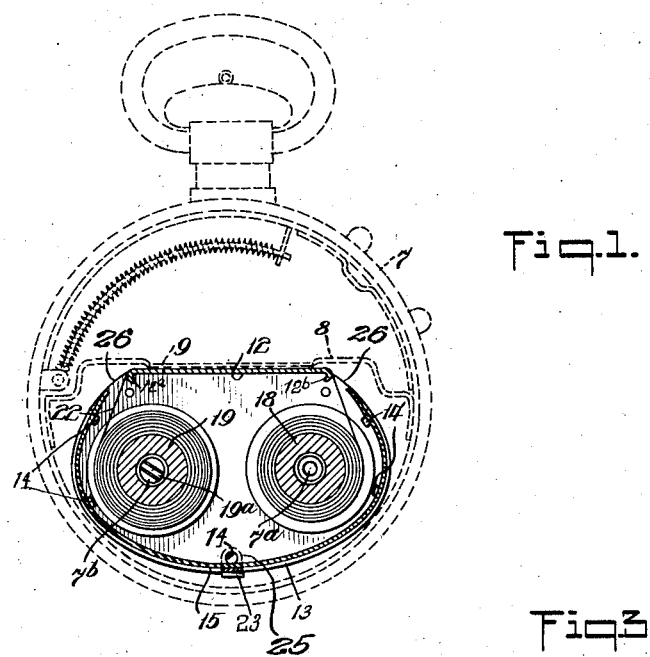
Fig.1.
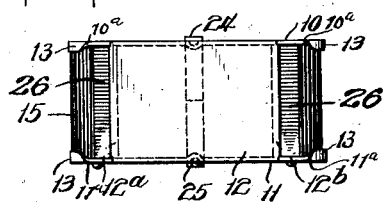
Fig.2.
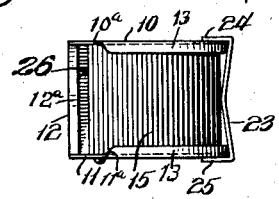
Fig.3.
Fig.4.
Fig.5.
INVENTOR
Thomas Wallace,
BY
ATTORNEYS Patented Sept. 26, 1922.

1,430,478

UNITED STATES PATENT OFFICE.

THOMAS WALLACE, OF NEW YORK, N. Y.

PHOTOGRAPHIC CAMERA.

Original application filed July 5, 1918, Serial No. 243,272. Divided and this application filed October 9, 1920. Serial No. 415,821.

*To all whom it may concern:*

Be it known that I, THOMAS WALLACE, a citizen of the United States, residing at 241 West 23rd Street, borough of Manhattan, city and State of New York, have invented a new and useful Improvement in Photographic Cameras, of which the following is a specification.

The present invention relates to improvements in photographic cameras of the general type and construction shown and described in Letters Patent No. 1,361,939, granted to me December 14, 1920, on my application filed July 5, 1918, Serial No. 243,272, of which this application is a division.

The general object of the present invention is to simplify the production of cameras of the so-called watch-case or vest pocket type, such as disclosed in my aforesaid Letters Patent by the introduction of refinements in the components thereof and the elimination of a number of manufacturing operations which were heretofore rendered necessary in producing structures of the prior art.

More specifically, my invention relates to the provision of a film holder for cameras of the type hereinbefore referred to which may be economically produced and which will at the same time embody structural features to render the same more efficient in serving the purposes for which they are intended.

In carrying this invention into effect, it has been my general object to provide a film holder formed of metal and of a design which will permit production of large quantities at a minimum of cost, the several components entering into the complete device being arranged to expedite assembly.

A further object of my invention is to provide a film holder having the aforesaid characteristics in which the film will traverse the exposure opening so as to present a flat surface upon which the subject is to be photographed, means being incorporated in the construction to insure free rotary movement of the film spools and to prevent buckling or jamming of the film when in motion, thereby overcoming disadvantages of prior devices of this type.

Other objects and advantages of my invention will become obvious as the description proceeds, and I would have it understood that I reserve unto myself all rights to the full range of equivalents both in structures and uses to which I may be entitled under my invention in its broadest aspect.

I shall now proceed to describe my invention with reference to the specific embodiment herein shown as used in combination with a watch-case or vest pocket camera of the general type illustrated in the drawings forming a part of my aforesaid Letters Patent, and will then point out with more particularity the essential elements of novelty therein, in the appended claims.

In the accompanying drawings:

Fig. 1 is a sectional view of a camera of the watch case of vest pocket tppe showing my improved film holder positioned therein, the film holder being shown in full lines.

Fig. 2 is a front elevation of a film holder made in accordance with my invention.

Fig. 3 is a side elevation of the structure shown in Fig. 2.

Fig. 4 is a plan view of the stamping which provides the top, front and base members of the film holder after being formed up.

Fig. 5 is a plan view of the back wall of the film holder, and

Fig. 6 is a view in elevation of the element employed for holding the top and bottom members of the device in functioning relation with the back wall shown in Fig. 5.

Referring now to the drawings in detail in which similar reference characters are employed to designate like parts throughout the several views, 7 indicates the casing of the camera which is of an annular configuration, the interior of which is preferably divided into a front and a rear compartment by the partition 8, formed with the exposure opening 9.

The film magazine or holder, which is preferably of a configuration to admit of the ready positioning thereof within the rear compartment formed by the partition 8 of the camera 7, may be formed of metal or any other material suitable to the purpose. The top 10, base 11 and front face or plate 12 are preferably formed integral from a single blank of material, these parts having the configuration shown in Fig. 4 or such other shape as may meet the requirements of the camera construction and the objects of this invention.

From Fig. 4 it will be observed that the edges of the top and bottom members 10 and 11, are flanged upwardly as shown at 13, the ends of the respective flanges terminating a short distance from the point of joinder of said members 10 and 11 with the front face or plate 12 as shown at 10ª and 11ª. The object of terminating the flanges 13 as described will become obvious as the description proceeds.

Spaced inwardly of the flanges 13 on the respective members 10 and 11, I form up a plurality of protuberances 14 which co-operate with said flanges in supporting the back wall or member 15 of the film magazine when the components are assembled as hereinafter explained.

The base forming member 11 is provided with two apertures 16 and 17 respectively through which the pin 7ª and the winding spindle 7ᵇ are adapted to protrude to engage the film spools 18 and 19 respectively in the usual manner, the upper ends of the said spools engaging the annular protuberances 20 and 21 formed up on the top member 10.

Obviously, when the top and base forming members 10 and 11 respectively are bent toward each other along the lines $a$ and $b$ to assume their proper positions relative to the plate 12 and form a right angle therewith, the apertures 16 and 17 and the protuberances 20 and 21 will be in axial alignment. The spools 18 and 19 on which the film 22 and the customary masking paper is wound are inserted in position between the top and base members 10 and 11, the upper ends thereof being engaged by the protuberances 20 and 21. The film which is fed from the spool 18 to the spool 19, traverses the front plate or face 12 of the film holder or magazine, the side edges of which are provided with curved or bevelled inwardly directed flanges 12ª and 12ᵇ. These flanges 12ª and 12ᵇ permit the film to move freely across the plate 12 and obviate any possibility of breakage of the film which would result were it to come in contact with a sharp surface.

When the film spools have been positioned between the top and base members 10 and 11 as described, the assembly of the magazine or holder is completed by locating the strip of material 15 shown in Fig. 5 between the top and base portions of the magazine or holder so as to form a wall therefor, the said strip 15 and the top and base members 10 and 11 being held in co-operative engagement by the clamping element 23.

The top and bottom edges of the strip of material 15, as heretofore explained, are positioned between the flanges 13 and the co-operating protuberances 14 of the top and base members of the film holder respectively, the length of said material being greater than that of the flanges 13 so that the side edges thereof extend beyond the ends of said flanges and co-operate with the flanges 12ª and 12ᵇ respectively of the plate 12 to form elongated openings or spaces 26 adjacent to said plate through which the film 22 is adapted to pass to and from exposure position. The material 15 which may be paper, metal or the like, is of a width corresponding to that of the front plate 12 of the film holder, and not only provides a light proof wall for the film holder, but serves as a means for maintaining the top and base members 10 and 11 in properly spaced relation to admit of the unobstructed movement of the film spools during the feeding operation.

The clamping element 23 is preferably a strip of light gage metal formed with inwardly directed portions 24 and 25 having protuberances 24ª and 25ª struck up on their opposite surfaces. These protuberances 24ª and 25ª are adapted to be seated in the depressions formed by the oppositely disposed protuberances 14 located intermediately of the ends of the top and bottom members 10 and 11 of the film holder. When the clamping element 23 is in engagement with the top and base members 10 and 11 as just described, the body portion thereof may be bent inwardly to the position shown in dotted line in Fig. 6, if desired, to draw the top and base members 10 and 11 into close contact with the top and bottom edges of the spacing and masking strip 15 and provide a substantially rigid structure.

The film holder, when positioned in the camera as shown in Fig. 1, is held in place by the pin 7ª and the rotatable spindle 7ᵇ which is slotted to engage a transverse pin 19ª located within the spool 19 whereby the said spool may be rotated to draw the film across the front plate 12 of the film holder, the said plate being in registry with the exposure opening 9 in the partition 8 of the camera.

While I have described my invention with reference to the specific embodiment herein illustrated, it is obvious that various changes in the structural details may be made without departing from the spirit and scope of my invention.

What I claim is:

1. A film holder, comprising top and bottom members and a front connecting plate forming a support for a portion of the film when in exposure position and a detachable member forming a wall for said film holder extending from a point adjacent one side of said plate to a point adjacent the other side thereof.

2. A film holder, comprising top and bottom members and a front connecting plate forming a support for a portion of the film when in exposure position, a detachable member forming a wall for said film holder and means for holding said detachable member in co-operative relation with said top and bottom members.

3. A film holder, comprising top and bottom members and a front connecting plate forming a support for a portion of the film when in exposure position, a detachable member forming a wall for said film holder and means for holding said detachable member in co-operative relation with said top and bottom members, said means including a removable clamping element.

4. A film holder, comprising top and bottom members and a front connecting plate having inwardly directed flanges provided along its free edges, said plate forming a support for a portion of the film when in exposure position, and a detachable member forming a wall for said film holder extending from a point adjacent one side of said plate to a point adjacent the other side thereof, and providing spaces through which the film is adapted to pass from the film spools and traverse said plate.

5. A film holder, comprising top and bottom members and a front connecting plate, said top and bottom members having oppositely disposed flanges formed on their free edges and substantially co-extensive therewith, a plurality of protuberances on each of said members spaced inwardly of the respective flanges, a detachable elongated member, the upper and lower edges of which are adapted to be positioned between the flanges and co-operating protuberances of each of said top and bottom members to form a wall for said film holder, and a clamping element adapted to engage said top and bottom members to hold said wall member in position therebetween.

THOMAS WALLACE.